United States Patent [19]

Reed

[11] Patent Number: 4,607,876
[45] Date of Patent: Aug. 26, 1986

[54] COVER FOR BED OF PICKUP TRUCK

[76] Inventor: David M. Reed, 1924 E. 5th Ave., Mesa, Ariz. 85204

[21] Appl. No.: 696,028

[22] Filed: Jan. 29, 1985

[51] Int. Cl.$^4$ ............................................... B60P 7/02
[52] U.S. Cl. ..................................... 296/100; 296/26; 296/159; 135/88
[58] Field of Search .................. 296/26, 27, 159, 164, 296/173, 100; 135/88

[56] References Cited

U.S. PATENT DOCUMENTS

| | | | |
|---|---|---|---|
| 3,367,347 | 2/1968 | Smith | 296/26 |
| 3,403,936 | 10/1968 | Young | 296/27 |
| 4,310,194 | 1/1982 | Biller | 296/159 |
| 4,332,265 | 6/1982 | Baker | 296/159 |

Primary Examiner—Robert R. Song
Attorney, Agent, or Firm—Drummond & Nissle

[57] ABSTRACT

A cover for the bed of a pickup truck. The cover can be utilized either as a tensioned cover attached to the upper edges of the walls of the truck bed to span the floor of the bed or can be utilized as a collapsible tent erected in the truck bed. The cover includes an articulated support frame adapted to be assembled to enclose and define a chamber and to be disassembled for compact storage; a first sheet of pliable material having a pair of opposed side edges adapted for detachable connection to the walls of the bed of a truck to tension the first sheet in horizontal orientation over the floor of the truck bed; a second sheet of pliable material attached to the first sheet and having an outer edge adapted to be connected to one of the bed walls; and, a third sheet of pliable material attached to the first sheet and having an outer edge adapted to be connected to one of the bed walls. The second and third sheets are folded inside the bed walls beneath the first sheet when the opposed side edges of the first sheet are connected to the bed walls to tension the first sheet over the floor of the truck bed. The first, second and third sheets fit over the frame with the outer edges of the second and third sheets connected to the bed wall when the opposed side edges of the first sheet are disconnected from the bed walls and the frame is assembled in the truck bed beneath the first, second and third sheets.

1 Claim, 14 Drawing Figures

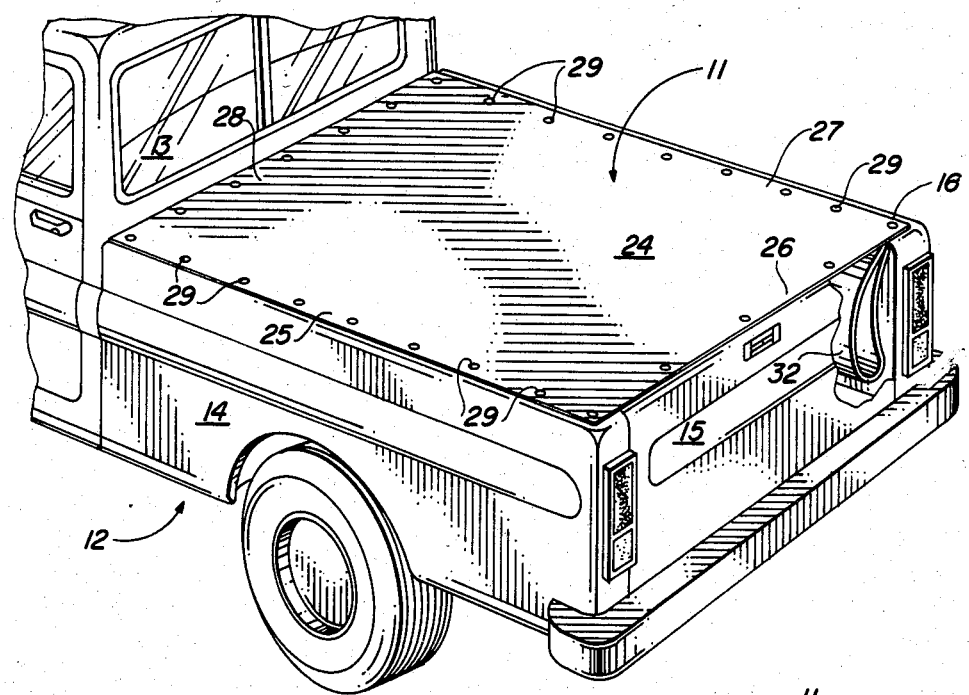
FIG-1
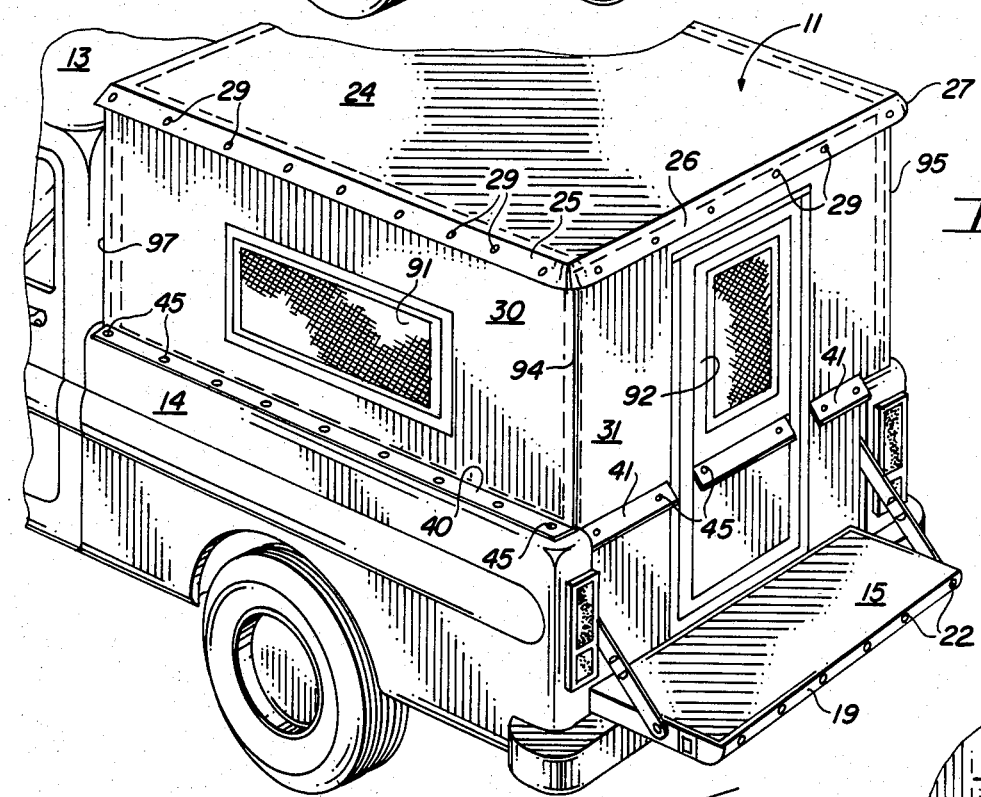
FIG-2
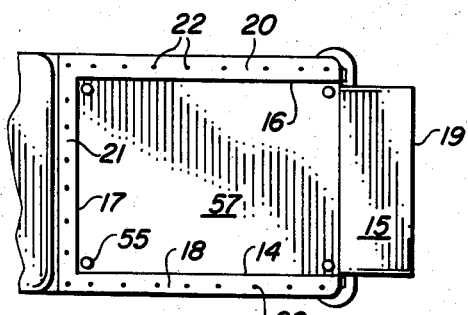
FIG-3
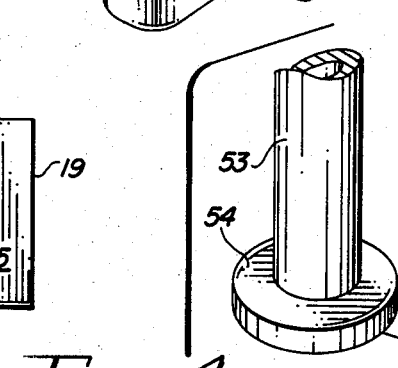
FIG-4
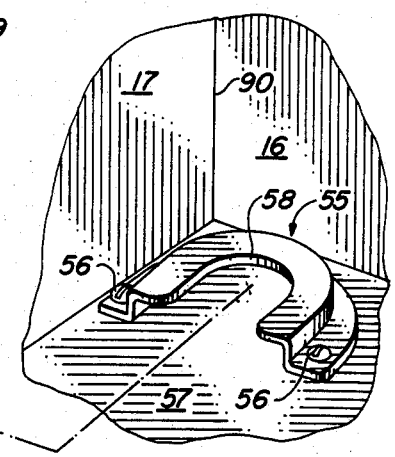

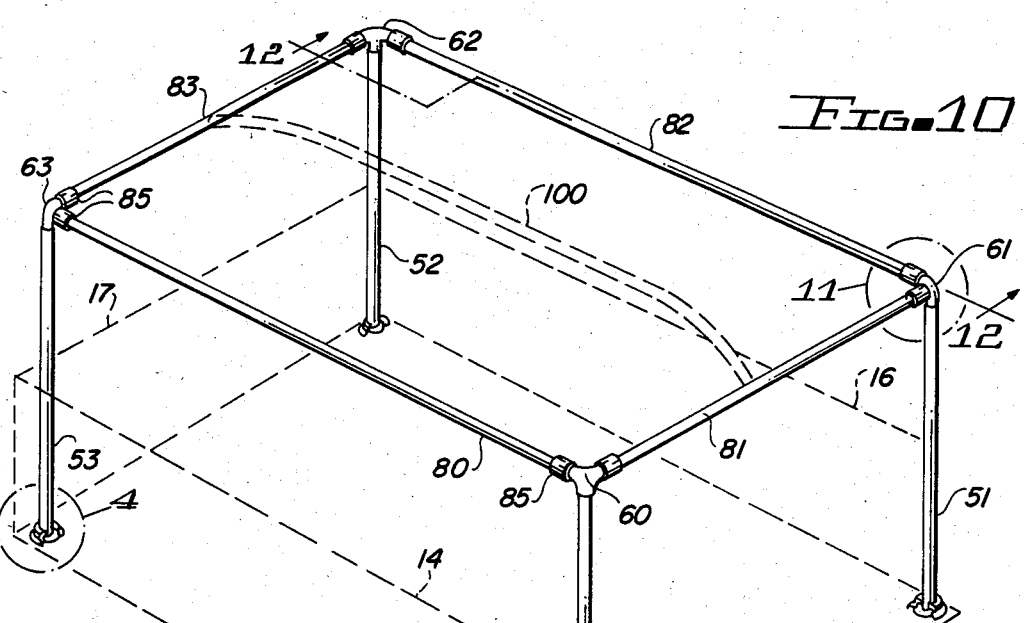
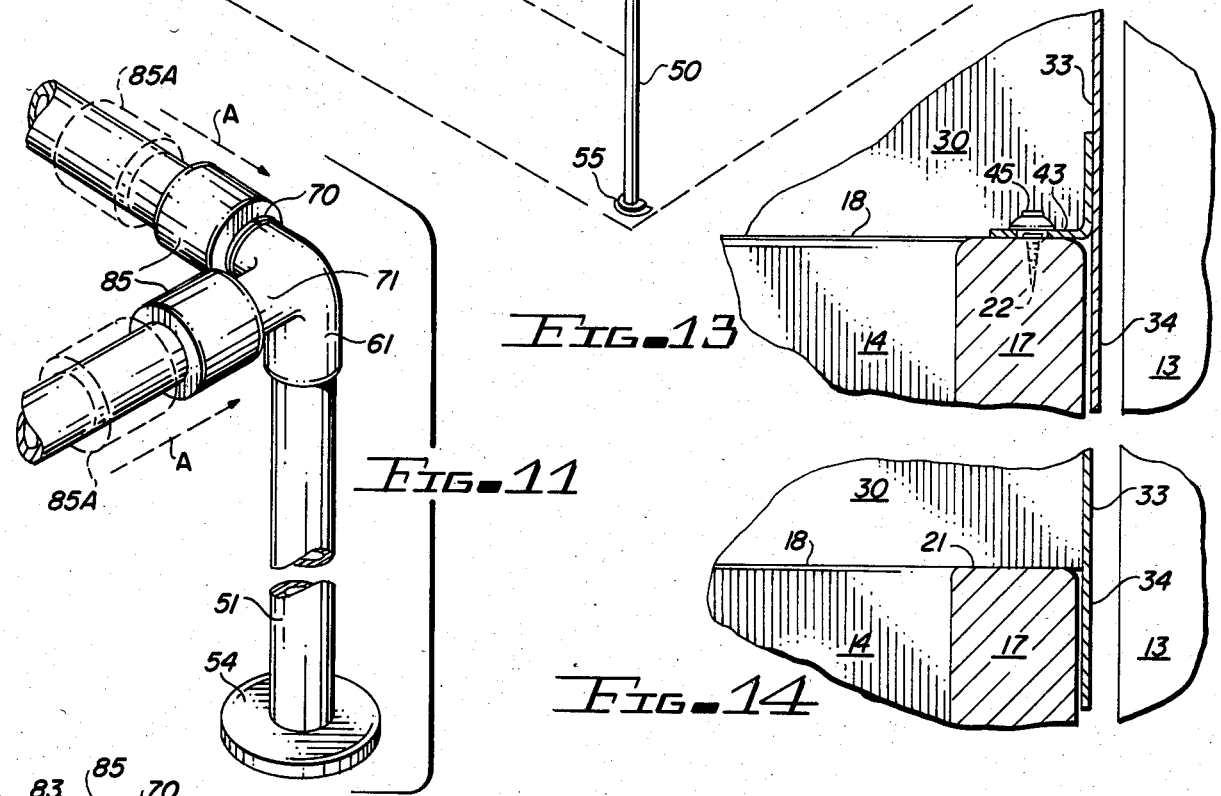
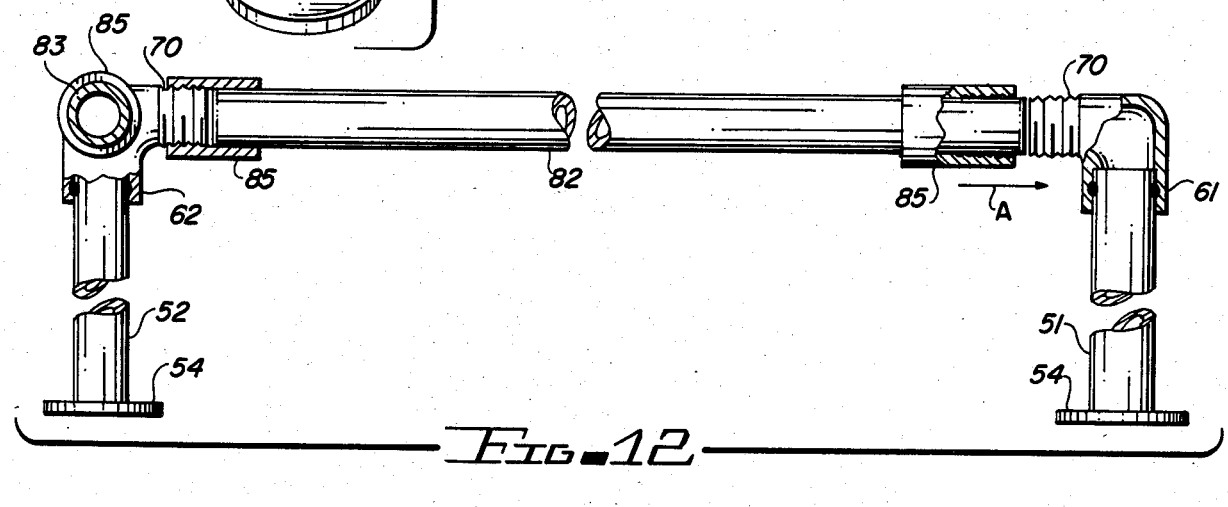

COVER FOR BED OF PICKUP TRUCK

This invention relates to protective covers for the beds of pickup trucks.

More particularly, the invention relates to a cover for a pickup truck bed which can be utilized either as a tensioned cover attached to the upper edges of the walls of the truck bed to span the floor of the bed, or, can be utilized as a collapsible tent erected in the truck bed.

In a further respect, the invention relates to a pickup truck bed cover of the type described which, when utilized as a tensioned cover attached to the walls of the truck bed to span the bed floor, folds and stores portions of the cover in the space intermediate the tensioned cover and floor of the truck bed.

Various types of portable or collapsible campers for the bed of a pickup truck are well known in the art. See, for example, U.S. Pat. Nos. 4,332,265 to Baker, 3,354,891 to Brown, 3,009,212 to Makens, 3,286,414 to Harrison et al, and 4,113,301 to Olmstead. Prior art campers which are readily collapsed or disassembled must either be fully assembled in position on the bed of a truck or be completely disassembled and stored in the bed of the truck or stored elsewhere. When prior art campers or tents are disassembled they do not, of course, provide protection for the bed of a truck or for cargo being carried in the bed. Further, a satchel or other storage container must be provided to hold and transport components of disassembled prior art campers.

Accordingly, it would be highly desirable to provide an improved pickup truck bed cover which could be utilized as a collapsible tent in the truck bed and which would, when not being used as a tent, provide protection for the bed of the truck and for disassembled components of the tent and other articles being transported in the truck bed.

Therefore, it is a principal object of the invention to provide an improved cover for the bed of a pick-up truck, the bed including a floor and a plurality of upstanding walls circumscribing the floor and each having a horizontally oriented upper edge.

Another object of the invention is to provide an improved cover of pliable material which can be utilized as a collapsible tent erected in the bed of a truck and which can, when the collapsible tent is disassembled, be attached to the upper edges of the bed walls and tensioned to span the bed floor and protect components of the disassembled tent and other articles being transported in the bed.

A further object of the instant invention is to provide an improved pickup truck bed cover of the type described which can be readily disconnected from the bed of a pickup truck and stored at a location apart from the truck.

Still another object of the invention is to provide an improved pickup truck bed cover of the type described which includes a central sheet of pliable material to be attached to the walls of the bed to span the bed floor and includes peripheral sheets of pliable material attached to the central sheet to form a tent in the bed of the truck when the central sheet is detached from the walls of the bed, the central and peripheral sheets being integrally formed as a unitary piece of material.

Yet another object of the invention is to provide an improved pickup truck bed cover of the type described in which the peripheral sheets of pliable material are, when the central sheet of pliable material is attached to the walls of the bed and tensioned to span the bed floor, folded inwardly into the bed and stored between the tensioned central sheet and bed floor.

These and other and further and more specific objects and advantages of the invention will be apparent to those skilled in the art from the following detailed description thereof, taken in conjunction with the drawings, in which:

FIG. 1 is a perspective view of the bed of a pick-up truck equipped with a cover constructed in accordance with the principles of the invention, a pliable sheet portion of the cover being attached to the upper edges of the walls of the bed to span the floor thereof;

FIG. 2 is a perspective view of the cover of FIG. 1 utilized as a tent in the bed of the truck;

FIG. 3 is a top view of the pickup truck bed of FIG. 1 after the cover of the invention has been completely removed therefrom;

FIG. 4 is a perspective assembly view of a component in the articulated framework utilized to support the pliable sheet portion of the cover in the manner depicted in FIG. 3;

FIG. 9 is still another side section view of the pliable sheet and the sheet attachment mechanism of FIG. 7 further illustrating the utilization of the pliable sheet to erect a tent in the bed of a pickup truck;

FIG. 10 is a perspective view illustrating the presently preferred construction of the articulated frame utilized to support the pliable sheet portion when the cover of the invention is being utilized to erect a tent in the bed of a pickup truck;

FIG. 11 is an enlarged perspective view of the portion of the support frame of FIG. 10 encircled by dashed line 11 therein;

FIG. 12 is a section view of a portion of the support frame of FIG. 10 taken along section line 12—12 thereof and illustrating further construction details thereof;

Figure 5:
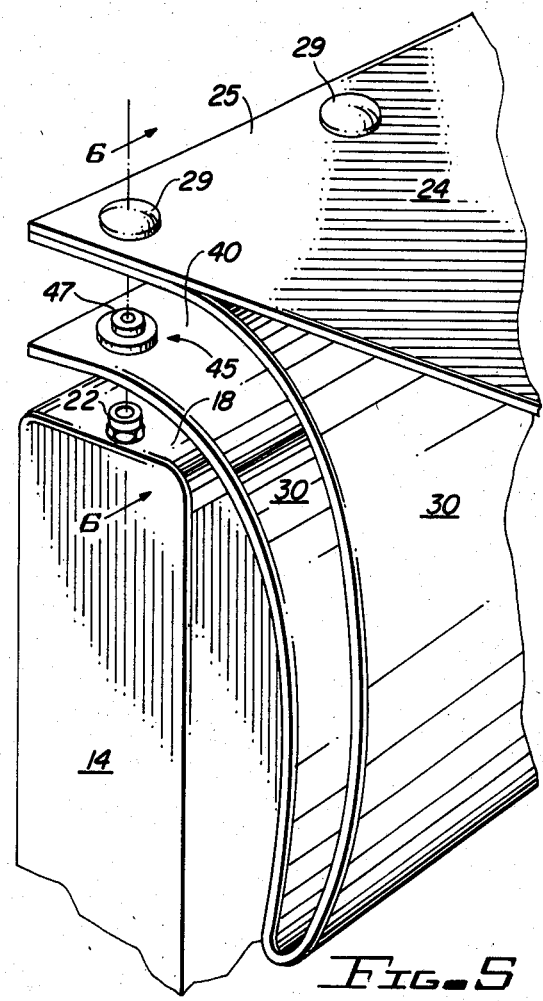
FIG. 5 is a perspective view illustrating attachment of the pliable sheet portion of the cover of the invention to the wall of the bed of a pickup truck.
Figure 7:
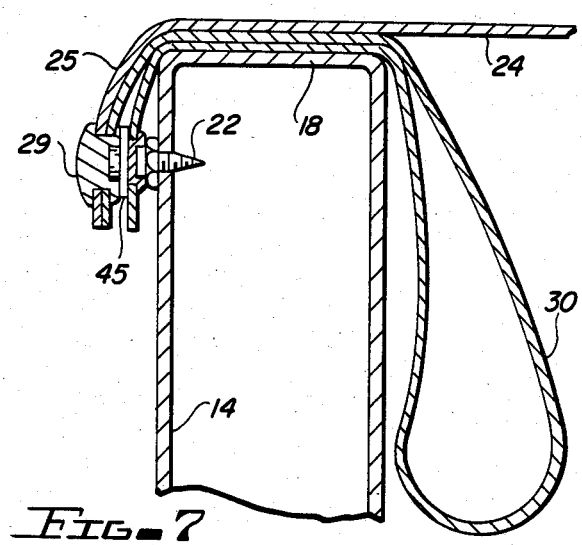
FIG. 7 is a partial side section view of the wall of a pickup truck bed and of a pliable sheet portion of the cover of the invention illustrating an alternate method of attaching the sheet portion to the bed walls to tension the sheet portion above the floor of the truck bed.
Figure 8:
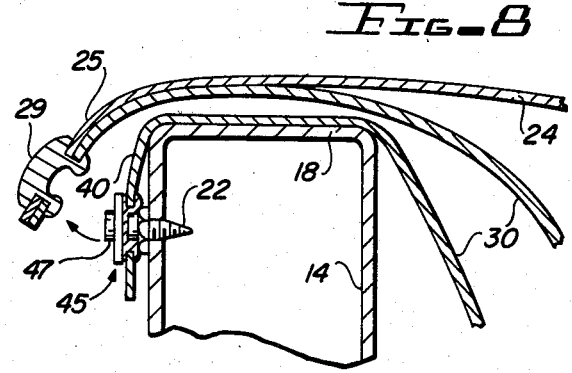
FIG. 8 is a partial side section view of the pliable sheet and of the sheet attachment mechanism of FIG. 7 illustrating the mode of operation thereof when the cover of the invention is being utilized to erect a tent in the bed of a pickup truck.

FIG. 13 is a side section view of the upper portion of the truck bed wall adjacent the cab of the truck, illustrating the attachment of the pliable sheet portion of the cover of the invention thereto; and, FIG. 14 is a side section view of the upper portion of the truck bed wall adjacent the truck cab illustrating the overlapping relationship of the pliable sheet portion of the cover with the upper edge of the bed wall.

Briefly, in accordance with my invention, I provide an improved cover for the bed of a pickup truck. The truck bed includes a plurality of upstanding side walls each having an upper generally horizontally oriented edge; and, a floor intermediate the side walls. The improved cover includes an articulated support frame including a plurality of rigid, elongate elements adapted to be assembled to define a chamber and disassembled for compact storage; a first sheet of pliable material having an outer edge adapted for detachable connection to the bed walls to tension the fabric sheet in generally horizontal orientation spanning the bed floor; a second sheet of pliable material attached to the first sheet and having an outer edge adapted for connection to the bed walls; and, a third sheet of pliable material attached to the first sheet and having an outer edge adapted for connection to the bed walls. The second and third sheets are folded inside the bed walls beneath the first sheet when the outer edge of the first sheet is detachably connected to the bed walls to tension the first sheet to span the bed floor and when the articulated frame is disassembled. The first, second and third sheets fit over the frame with the outer edges of the second and third sheets connected to the bed walls when the outer edge of the first sheet is disconnected from the bed walls and the frame is assembled in the bed beneath the first, second and third sheets.

Turning now to the drawings, in which the presently preferred embodiments of the invention are shown for the purpose of illustrating the practice thereof and not by way of limitation of the scope of the invention and in which like elements are indicated by corresponding reference characters throughout the several views, FIG. 1 illustrates a cover of pliable sheet material generally indicated by reference character 11 and attached to the bed of a pickup truck. The bed includes side walls 14, 15, 16 and 17. Wall 17 is, as indicated in FIGS. 3, 13 and 14, adjacent cab 13. As illustrated in FIG. 3, walls 14–17 include normally horizontally oriented upper edges 18, 19, 20 and 21, respectively, provided with male snap attachments 22.

In FIG. 1 horizontally oriented pliable sheet 24 of cover 11 is provided with female snap attachments 29 along its outer edges 25, 26, 27, 28. Attachments 29 are snapped onto male attachments 22 and secure sheet 24 to upper edges 18–21 of walls 14–17 to tension sheet 24 over the floor of the bed.

Figure 6:
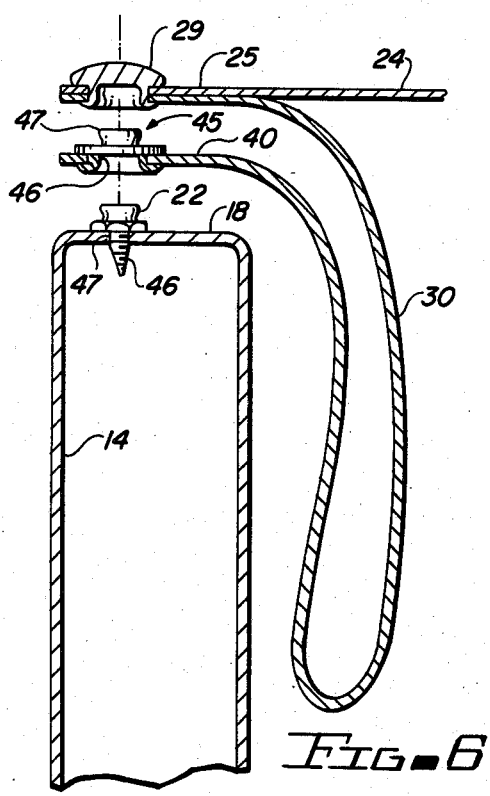
FIG. 6 is a section view of the pliable sheet and attachment mechanism of FIG. 5 taken along section line 6—6 thereof and further illustrating construction details thereof.
Figure 9:
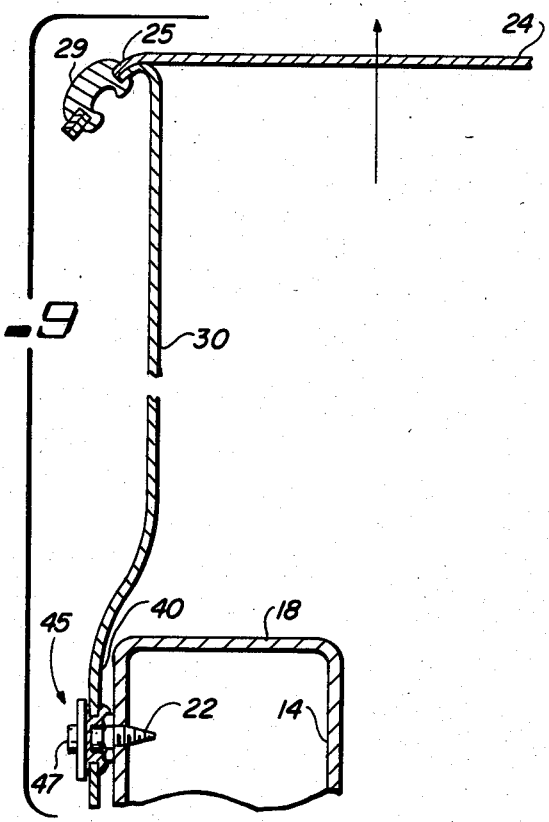
FIG. 9 is still another side section view of the pliable sheet and the sheet attachment mechanism of FIG. 7 illustrating the mode of operation thereof when the cover of the invention is being utilized to erect a tent in the bed of a pickup truck.

FIG. 2 depicts cover 11 after female snap attachments 29 have been separated from attachments 22 and the articulated framework of FIG. 10 has been installed in the bed beneath cover 11. Sheet 24 is attached to sheets 30, 31, 32, 33 as variously illustrated in FIGS. 1, 2, 5–9, 13 and 14. Sheets 30–33 have edge portions 40, 41, 42 (not visible) and 43 (FIG. 13) provided with combination male-female snap attachments 45. Attachments 45 each include lower female portion 46 and upper male portion 47. Portion 47 of each attachment 45 snaps into its associated female attachment 29 on one edge 25–28 of pliable sheet 24 when cover 11 is installed in the manner shown in FIG. 1. Portion 46 of each attachment 45 snaps onto its associated name fitting 22 on walls 14–17 of the bed in the manner illustrated in FIGS. 5–9. As shown in FIG. 6, it is presently preferred to provide fittings 22 with an externally threaded metal screw throat which is turned into an aperture 47 formed in the upper portion of one of the bed walls.

In FIGS. 1, 2, 3, 5, 6 and 13 fittings 22 are attached to the upper horizontal edge surfaces 18–21 of walls 14–17, respectively. Alternatively, fittings 29 can be mounted in the vertical side surfaces of walls 14–17 in the manner illustrated in FIGS. 7–9.

The articulated support frame of FIGS. 4, 10–12 includes cylindrical vertical support legs 50–53 each provided with a flat cylindrical foot 54 (FIG. 4) which is detachably slidably fixedly received by a horseshoe shaped member 55 secured to the floor 57 of the truck bed by screws 56. Foot 54 slides beneath mouth 58 of member 55. Mouth 58 fits around cylindrical member 53. Member 55 can be mounted on floor 57 such that mouth 55 opens toward corner 90 of the truck bed. The upper end of each leg 50–53 is received by and fixedly secured to a right angle fitting 60–63 provided with a pair of perpendicular generally horizontal externally threaded arms 70, 71. Both ends of each horizontally oriented arm 80, 81, 82, 83 slidably carry an internally threaded sleeve 85 which turns onto one of arms 70, 71 of a right angle fitting 60–63. In FIG. 11 the position of sleeves 85 prior to being turned onto arms 70, 71 is indicated in ghost outline by dashed lines 85A. Sleeves 85 are displaced in the directions indicated by arrows A when they are threaded onto arms 70, 71.

In use, FIG. 3 is a top view of the bed of a pick-up truck prior to the installation of the cover of the invention. In FIG. 3 male fittings 22 have been attached to the upper generally horizontal edges 18–21 of walls 14–17 of the truck bed. To install cover 11 on the truck bed, the female portion 46 of each fitting 45 along edge 40 of sheet 30 is snapped onto its associated male fitting 22 on edge 18 of wall 14 in the manner shown in FIG. 2; portion 46 of each fitting 45 along edge 41 of sheet 31 is snapped onto its associated fitting 22 on edge 19 of tailgate 15 (with the tailgate in its normal closed position); portion 46 of each fitting 45 along edge 42 (not visible in FIG. 1) of sheet 32 is snapped onto its associated fitting 22 on upper edge 20 of wall 16; and, portion 46 of each fitting 45 along edge 43 (FIG. 13) of sheet 33 is snapped onto its associated fitting 22 along upper edge 21 of bed wall 17. After each fitting 45 has been snapped onto its associated fitting 22, the support frame of FIGS. 10–12 can be erected in the bed of the truck beneath cover 11 to form the tent shown in FIG. 2, or, each fitting 29 along edges 25–28 of sheet 24 can be attached to the male portion 47 of its associated fitting 45 such that the cover sheet 24 is tensioned between walls 14–17 and spans the bed floor in the manner illustrated in FIG. 1. When cover 11 is installed on a truck bed as shown in FIG. 1, sheets 30–33 are inwardly folded between pliable sheet 24 and floor 57 of the bed. In FIG. 1, a portion of tailgate 15 is broken away to illustrate sheet 32 folded inwardly beneath cover 24. In FIG. 1 sheet 31 is not, for the sake of clarity, shown in the break away view exposing sheet 32. FIGS. 5–8 similarly illustrate the inward folding of pliable sheet 30 when edge 25 of sheet 24 is attached to edge 18 of wall 14.

The support frame of FIG. 10 is installed in the bed of a truck beneath cover 11 by slidably inserting foot 54 of each leg 50–53 in its respective holder 55 affixed to the floor of bed 57. Each arm 80–83 is then secured in horizontal position between its associated pair of legs 50–53 by turning the internally threaded sleeves 85 carried on each end of the arm onto an externally threaded arm 70 or 71. Cover 11 can, if desired, be installed on the truck after the support frame of FIG. 10 is erected in the truck bed.

Pliable sheet 30 can be provided with mosquito net window 91. Door means 92 can be formed in sheet 31. Sheet 33 can, as shown in FIG. 14, be fabricated without flap 43 and such that the lower portion 34 of sheet 33 extends downwardly below upper surface 21 of wall 17 between wall 17 and cab 13. When sheet 33 extends below surface 21 as depicted in FIG. 14, water is shed from the outer surface of sheet 33 downwardly between wall 17 and cab 13 and is prevented from entering the bed area enclosed and circumscribed by interconnected sheets 24, 30-33. Sheets 30-31 are preferably connected at corner 94; sheets 31, 32 at corner 95; sheets 32, 33 at their juncture corner (not visible); and, sheets 33, 30 at corner 97. Cross beam 100 can be incorporated into the articulated frame on FIG. 10 to slope open sheet 24 when the tent is erected as shown in FIG. 2.

Having described my invention in such terms as to enable those skilled in the art to understand and practice it, and having identified the presently preferred embodiments and best mode thereof, I claim:

1. A cover adapted to be attached to the bed of a truck, the truck bed including
   at least a pair of opposed upstanding side walls each having an upper generally horizontally oriented edge, and
   a floor intermediate said walls,
   said cover including
   (a) an articulated support frame including a plurality of rigid, elongate elements adapted to be assembled to define a chamber and disassembled for compact storage;
   (b) a first sheet of pliable material having at least a pair of opposed side edges adapted for detachable connection to said bed walls to tension said first sheet in generally horizontal orientation spanning said floor;
   (c) a second sheet of pliable material attached to said first sheet and having
      (i) an outer edge adapted for connection to one of said side walls of said truck bed, and
      (ii) an inner edge attached to one of said side edges of said first sheet;
   (d) a third sheet of pliable material attached to said first sheet and having
      (i) an outer edge adapted for connection to the other side of said side walls of said truck bed, and
      (ii) an inner edge attached to the other of said side edges of said first sheet;
   said second and third sheets being folded inside said bed walls beneath said first sheet when said opposed side edges of said first sheet are detachably connected to said bed walls to tension said first sheet to span said floor and when said frame is disassembled; and,
   said first, second and third sheets fitting over said frame with said outer edges of said second and third sheets connected to said bed walls when said opposed side edges of said first sheet are disconnected from said bed walls and said frame is assembled in said bed beneath said first, second and third sheets.

* * * * *